United States Patent [19]

Cherichetti et al.

[11] Patent Number: 5,765,041

[45] Date of Patent: Jun. 9, 1998

[54] SYSTEM FOR TRIGGERING DIRECT MEMORY ACCESS TRANSFER OF DATA BETWEEN MEMORIES IF THERE IS SUFFICIENT DATA FOR EFFICIENT TRANSMISSION DEPENDING ON READ WRITE POINTERS

[75] Inventors: Cory Ansel Cherichetti, Kingston; Paul David Dinicola, Hurley, both of N.Y.; Charles Ray Johns, Austin, Tex.; Omar Mahmoud Rahim; David Andrew Rice, both of Syracuse, N.Y.; Mark Ernest Van Nostrand, Staatsburg, N.Y.

[73] Assignee: International Business Machines Corporation, Armonk, N.Y.

[21] Appl. No.: 646,010

[22] Filed: May 7, 1996

Related U.S. Application Data

[63] Continuation of Ser. No. 144,175, Oct. 27, 1993, abandoned.

[51] Int. Cl.⁶ ............................................. G06F 13/00
[52] U.S. Cl. ..................... 395/872; 395/842; 395/446
[58] Field of Search ........................... 395/872, 842, 395/446, 506, 122, 450; 382/216; 365/221; 370/235

[56] References Cited

U.S. PATENT DOCUMENTS

| | | | |
|---|---|---|---|
| 4,430,699 | 2/1984 | Segarra et al. | 395/200.6 |
| 4,697,233 | 9/1987 | Scheuneman | 395/496 |
| 4,757,440 | 7/1988 | Scheuneman | 395/185.06 |
| 4,809,323 | 2/1989 | Baumbaugh et al. | 365/221 |
| 4,864,629 | 9/1989 | Deering | 382/34 |
| 4,885,703 | 12/1989 | Deering | 364/522 |
| 5,022,090 | 6/1991 | Masaki et al. | 382/303 |
| 5,043,981 | 8/1991 | Firoozmand et al. | 370/85.1 |
| 5,046,080 | 9/1991 | Lee et al. | 379/53 |
| 5,065,343 | 11/1991 | Inoue | 395/162 |
| 5,109,520 | 4/1992 | Knierim | 395/800 |
| 5,113,494 | 5/1992 | Mendendez et al. | 395/163 |
| 5,210,749 | 5/1993 | Firoozmand | 370/85.1 |
| 5,289,577 | 2/1994 | Gonzales et al. | 395/163 |
| 5,444,853 | 8/1995 | Lentz | 395/250 |

FOREIGN PATENT DOCUMENTS

| | | |
|---|---|---|
| 0454605A3 | 10/1991 | European Pat. Off. . |
| 0489504A2 | 6/1992 | European Pat. Off. . |

OTHER PUBLICATIONS

Computer Design, "Dynamic FIFO Speeds Controller Throughput", Apr. 1, 1987, 26, No. 7, Littleton, MA, p. 47.

*Primary Examiner*—Thomas C. Lee
*Assistant Examiner*—Le Thien Luu
*Attorney, Agent, or Firm*—George E. Clark; Jenkens & Gilchrist; Mark S. Walker

[57] ABSTRACT

Data is transferred from a host system to a subsystem connected to the host by a system bus in an efficient manner using one or more virtual first in first out (FIFO) registers in host memory and a corresponding set of virtual FIFOs located in the subsystem memory. A transmission controller controls the transfer of data from the host FIFOs to the subsystem FIFOs while the subsystem processor reads and processes data from the subsystem FIFO. By accumulating data in the host FIFOs before transfer to the subsystem, overhead associated with starting and stopping data transfers over the system bus is substantially reduced.

12 Claims, 4 Drawing Sheets

SYSTEM FOR TRIGGERING DIRECT MEMORY ACCESS TRANSFER OF DATA BETWEEN MEMORIES IF THERE IS SUFFICIENT DATA FOR EFFICIENT TRANSMISSION DEPENDING ON READ WRITE POINTERS

This application is a continuation of application Ser. No. 08/144,175, filed on Oct. 27, 1993, which was abandoned upon the filing hereof.

BACKGROUND OF THE INVENTION

1. Field of the Invention

The present invention relates to data processing systems having a host system and a peripheral subsystem attached to the host by a communications subsystem, and more particularly to a data processing system having a host system attached to a peripheral subsystem by a communications subsystem wherein data is transmitted between the host system and the peripheral subsystem by direct memory access.

2. Prior Art

For the past few years, most data processing systems have offered some type of graphics output as a standard feature. This graphics output could range from a simple two dimensional graphics reproduction capability to very advanced three dimensional graphics reproduction capability. Graphics subsystems vary considerably in terms of complexity, part count, and cost. A two dimensional graphics subsystem, for example, may consist only of a frame buffer and video logic; while a three dimensional graphic subsystem typically will consist of one or more floating-point processors, several custom very large scale integrated (VLSI) circuits, one or more frame buffers, and video logic. In either case, the host executes the graphics application program and generates an appropriate data stream for the graphics subsystem. The difference between the relatively simple 2D graphics and the more complex 3D graphics lies in where the graphics order processing and rasterization occur. In the simple 2D graphics subsystem example, the host processor performs the graphics order processing and rasterization in software, while in the more complex 3D graphics subsystem example, hardware and microcode in the graphics subsystem process graphics orders and other graphics processing. To allow customers greater flexibility in configuring a system that best meets the customer's need, graphics subsystems are typically offered as stand alone features.

The graphics subsystems are usually attached to the host processor complex by a general purpose bus. Data transfer between the host processor and the graphics subsystem can occur in one of two ways. First, the host processor may store the data directly into the graphics subsystem using Programmable Input Output (PIO) transfer or, second, the graphics subsystem may read the data from host memory using direct memory access (DMA). PIO is a data transfer mechanism that uses an instruction in the host processor to move a single word of data from or to a register in the host processor to or from a graphics subsystem. Since a DMA operation is most efficient for large transfer sizes, and since graphics applications usually generate small transfer sizes, the DMA mechanism for data transfer is rarely used for graphics applications. PIO is the typical mechanism used for transfer of data to a graphics subsystem. PIO allows the host processor to directly send data to the graphics subsystem. However, the PIO mechanism typically does not efficiently use the bandwidth of the bus connecting host processor and the graphics subsystem.

Direct Memory Access (DMA) method and apparatus are disclosed in U.S. Pat. No. 3,812,475 to Christiansen et al. which patent is incorporated by reference in this Application.

U.S. Pat. No. 4,430,699 which discloses a distributed data processing system, generally shows interconnection of several local systems controlled by systems intercommunications processors which are responsible for coordination and communication control initialization and simulation relative to communications between the local systems. A functional communications layer is responsible for the communications protocols. A transport layer including transport modules and a looped optical bus provides the hardware layer for the transmission of data between local systems and the distributed data processing system.

Although the distributed data processing system of the patent employs first in first out (FIFO) registers to store data for transmission between local systems, the patent does not teach the use of a plurality of virtual FIFOs in the host memory and the subsystem memory which operate under the control of an independent processor to increase the efficiency of data transfer between a host and a subsystem and eliminate overhead inherent in short bursts of start-stop data transfer.

SUMMARY OF THE INVENTION

It is a primary object of the present invention to efficiently transfer data between a host and a subsystem by first writing data to one or more virtual FIFO registers located in system memory to accumulate a predetermined minimum amount of data to be transferred and then transferring the minimum amount of data to a corresponding set of FIFO registers located in the subsystem memory using direct memory access techniques operating under the control of a transfer processor. By accumulating data in the FIFO registers before transfer, the effects of overhead associated with starting and stopping data transfers over the system bus is minimized.

Accordingly, a data processing system includes a host processor having a host memory associated therewith, an input output subsystem having a processor for processing data from the host processor, a subsystem memory for storing information transmitted between the host and the subsystem, and a communications processor for controlling data transfer between the host memory and the subsystem memory employing direct memory access.

In a preferred embodiment, a data processing system may include a workstation host having a main memory, a system bus for transferring data, and a graphics subsystem connected to the system bus for executing graphics orders generated by the host processor. One or more virtual FIFOs are established in system memory, and a corresponding set of virtual FIFOs are established in the graphics subsystem memory for storing data to be accumulated and transferred across the system bus. A communications processor controls transfers using direct memory access techniques when a predetermined amount of data has accumulated in the host memory FIFOs.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
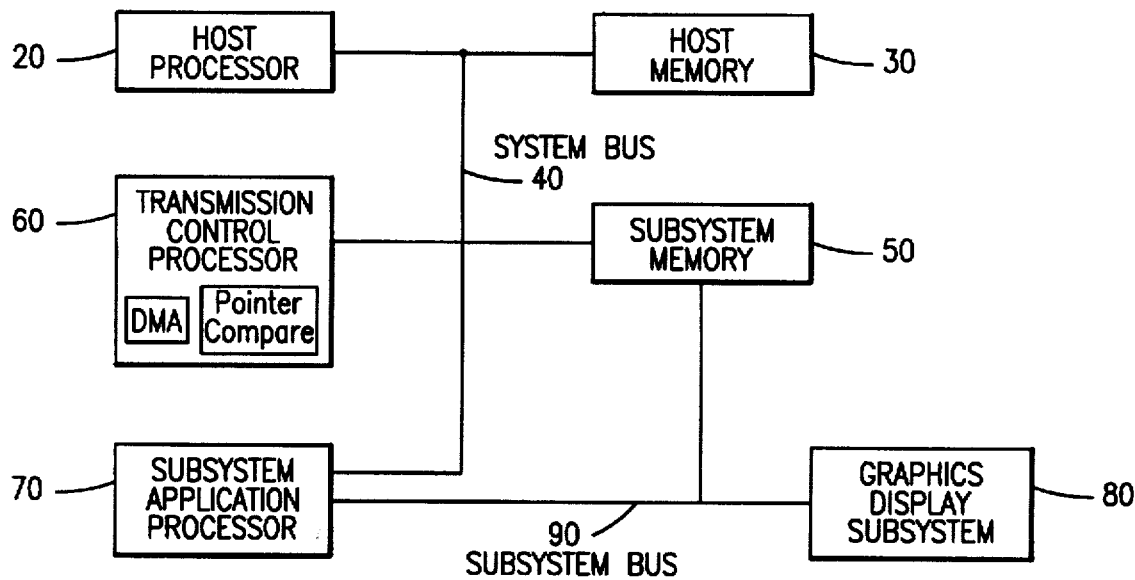
FIG. 1 is a block diagram of a preferred embodiment of the present invention.

In general, the performance of certain peripheral subsystems, such as graphics drawing subsystem are limited by the amount of data which can be transferred from an application program processor such as a host processor to the subsystem processor such as a graphics processor. The primary limiting element in this transfer is the amount of control and data information which can be transmitted across an input output bus within a given period of time. As circuit and memory technology have improved dramatically in recent years, processing capability has also increased by at least a factor of 10. During the same period, however, data transfer rates on system buses have only increased by a factor of approximately 2-3.

A general purpose bus is much more efficient moving large amounts of data using a direct memory access technique rather than smaller amounts of data employing an incremental demand response technique or PIO.

It is common in graphics processing applications that a relatively small amount of data and control information must be transferred from the application program processor to the graphics processor in any single transfer. Since the graphics data/control information transfer size is small, the DMA overhead would not justify using the DMA mechanism, and, therefore, the PIO mechanism was the better of two poor choices for information transfer between host and subsystem. The slower demand response input output operation (PIO) ties up the application program processor and reduces the processing bandwidth available to the application program. More efficient transfer of Information between a host and a subsystem may be achieved through the use of a direct memory access (DMA) technique for relatively small information transfers by relieving the host processor of performing the slower PIO transfers.

The present invention will now be described with reference to the drawing figures briefly described above.

Referring now to FIG. 1, an apparatus embodying the present invention will be described. Information handling system 10 includes a host processor 20 which performs application program processing under the control of an operating system program. Host processor 20 is connected to system bus 40 and to host memory 30 which stores program and data information related to the processing performed in host processor 20. System bus 40 transmits program and data information to a peripheral subsystem which may include a subsystem application processor 70, a subsystem memory 50 and a graphics display system 80. A transmission control processor 60 is connected to the system bus 40 and controls the transmission of program and data information between host memory 30 and subsystem memory 50 across system bus 40. Subsystem application processor 70 processes graphics orders and associated data and provides input to graphics display subsystem 80 across subsystem bus 90 to permit graphics display subsystem 80 to generate a pixel by pixel representation of an image to be displayed.

Figure 2:
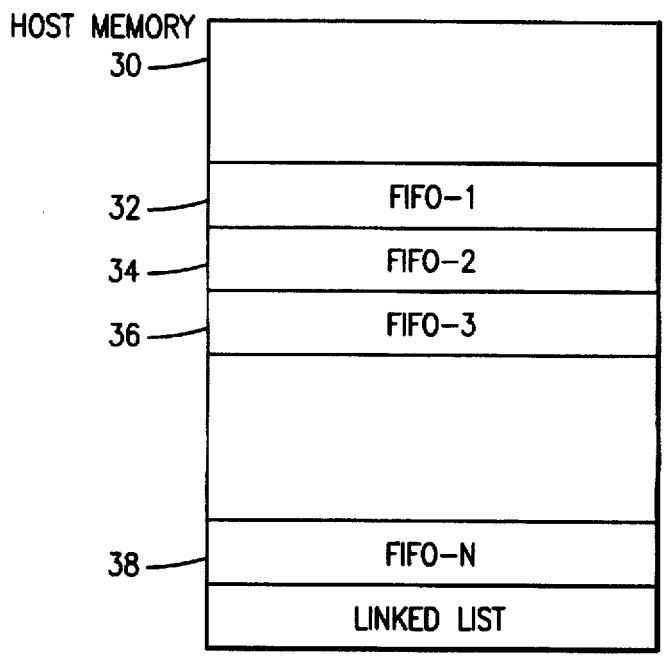
FIG. 2 is a schematic diagram of a host memory of the embodiment of FIG. 1, showing FIFO Register allocations.
Figure 3:
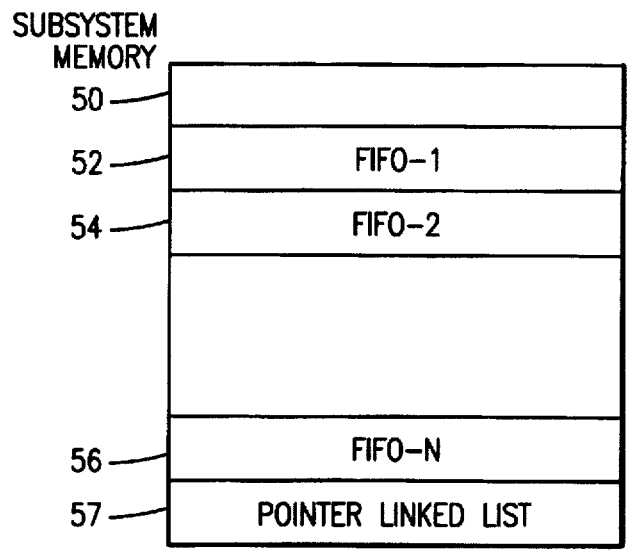
FIG. 3 is a schematic diagram of a subsystem memory of the embodiment of FIG. 1, showing FIFO Register allocations.

Referring to FIGS. 2 and 3, the allocation of temporary registers in the host memory 30 and subsystem memory 50 will be described. Each application being processed by host processor 20 has allocated to it a temporary register in host memory 30 such as FIFO-1 32, FIFO-2 34, FIFO-3 36, and so on to FIFO-n 38. In subsystem memory 50 there are corresponding temporary storage registers such as FIFO-1 52, FIFO-2 54, . . . FIFO-n 56. Host processor 20 executes an application program and writes the appropriate control or data information into the predetermined FIFO buffer such as 32 in the host memory 30. Transmission control processor 60 controls the transmission of the information in FIFO-1 32 across system bus 40 to corresponding temporary register FIFO-1 52 in subsystem memory 50. Subsystem application processor 70 then reads the information from FIFO-1 52 in subsystem memory 50 and processes the information to provide input to the graphics display subsystem 80.

Figure 4:
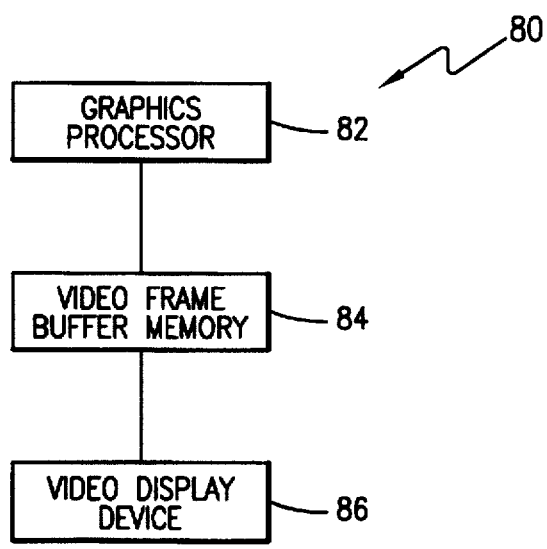
FIG. 4 is a block diagram of a graphics display subsystem of the embodiment of FIG. 1.

Referring now to FIG. 4, a graphics display subsystem 80 includes a graphics processor 82 for converting graphics orders into a series of pixel representations for display, a video frame buffer memory 84 for storing electronically a representation of the image to be displayed and the video display device 86 for providing a visual display of the image stored in video frame buffer memory 84.

As each application is begun in the host processor 20 a FIFO such as FIFO-1 32 in host memory is allocated for exclusive use by that application. It is contemplated that there may be multiple applications in operation at any point in time each having a dedicated temporary storage register such as FIFOs 32, 34, 36, 38 in host memory 30 and corresponding FIFOs in subsystem memory 50.

Management of the FIFOs 32, 34, 36, 38, 52, 54, 56 requires that for each such FIFO, pointers are maintained for read, write, top and bottom.

The top and bottom pointers define the start and end addresses respectively of the FIFOs 32, 34, 36, and 38 in system memory 30. The read pointer defines the address of the last word of data or control information transferred to graphics subsystem 80. The write pointer defines the address of the last word of data or control information that has been written by the host processor 20.

The transmission control processor 60 controls transfer of a block of data or control information starting from the address indicated by the read pointer and ending at the address indicated by the write pointer.

Figure 5:
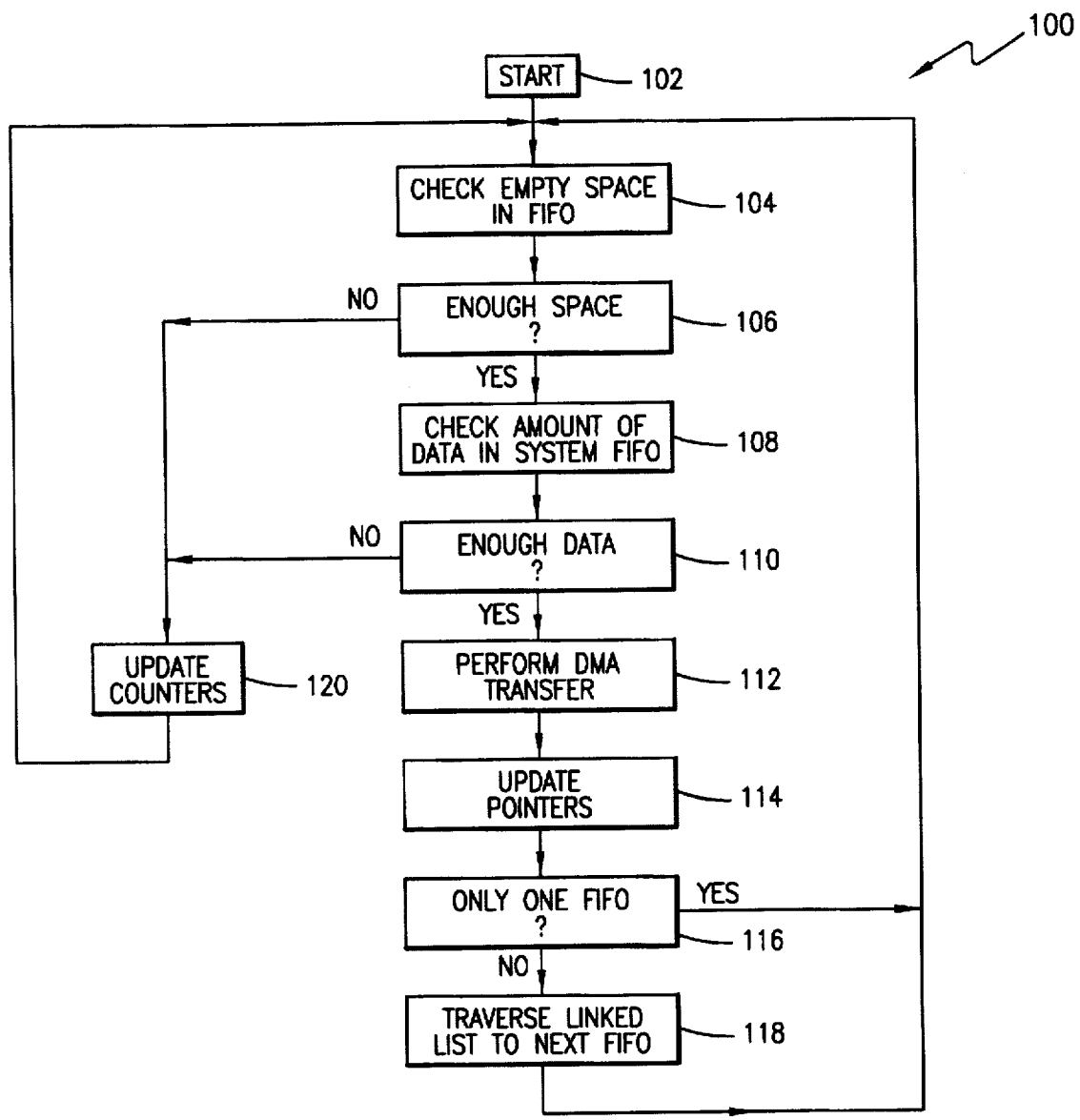
FIG. 5 is a flow chart of the information transfer process between host and subsystem memories in accordance with the preferred embodiment of the present invention.

Referring now to FIG. 5, the transmission of control and data information from host memory 30 to subsystem memory 50 across system bus 40 under the control of transmission control processor 60 will be described.

The read and write pointers are maintained in linked list 57 in subsystem memory 50 and host memory 30. Transmission control processor 60 scans linked list 57 and transfers data as required. Linked list 57 is updated as new FIFOs are added or deleted from the system. FIFOs are added to linked list 57 as they are allocated to an application program. FIFOs are deleted from the linked list 57 as application programs are terminated. As additional applications are executed on host processor 20, additional FIFO pointers are added to linked list 57. Similarly, when an application is terminated from executing on the host processor 20, its corresponding FIFO pointers are removed from linked list 57.

Linked lists are very well-known structures, and it is well-known to those of skill in the art how registers are added or deleted from a linked list.

The information transmission process 100 which operates under the control of transmission control processor 60 to move data from host memory 30 to subsystem memory 50 across system bus 40 will now be described. A first FIFO in subsystem memory 50 such as FIFO-1 52 is examined at step 104 to determine the amount of available storage space in the FIFO. Transmission control processor 60 performs step 106 to determine if the amount of available storage space in subsystem memory FIFO 52 is sufficient for accepting data transmissions, by reading and comparing the read pointer and write pointer associated with FIFO 52. If the pointers indicate that FIFO 52 is full, then transmission control processor 60 will update counter 120 indicating an additional unsuccessful attempt at accessing FIFO 52. If step 106 determines that there is sufficient space, transmission control processor 60 then initiates a test 108 of a corresponding FIFO such as 32 in host memory 30 to determine whether FIFO 32 has sufficient data to be transferred to result in efficient utilization of the resources of system bus 40.

Similarly, in step 108 and in step 110, transmission control processor examines the read pointer and write pointer of system FIFO 32. If the read pointer and write pointer of FIFO 32 indicate an empty FIFO, then counter 120 is incremented indicating an unsuccessful attempt, and transmission control processor 60 proceeds to the next FIFO 34 on the list at step 118. Once the read pointer and write pointer of a FIFO such as 32, 34, 36 . . . 38 in host memory 30 indicate sufficient amount of data to be transferred to subsystem memory 50, transmission control processor 60 will initiate data transfer across system bus 40. Transmission control processor 60 will cause the data to be transferred at step 112 on system bus 40 employing a direct memory access technique such as is described in U.S. Pat. No. 3,812,475 incorporated by reference herein. Once the information transfer is complete, transmission control processor 60 updates read and write pointers in host memory 30 and subsystem memory 50 respectively at step 114 and then moves to the next FIFO in linked list 57. If there is only 1 FIFO as detected in step 116, process 100 returns to the start 102 of the process to perform the next transfer under control of transmission control processor 60. The above steps are then executed for the next and each successive FIFO 34, 36 . . . 38 in the linked list or until the application program has completed execution or is terminated.

Figure 6:
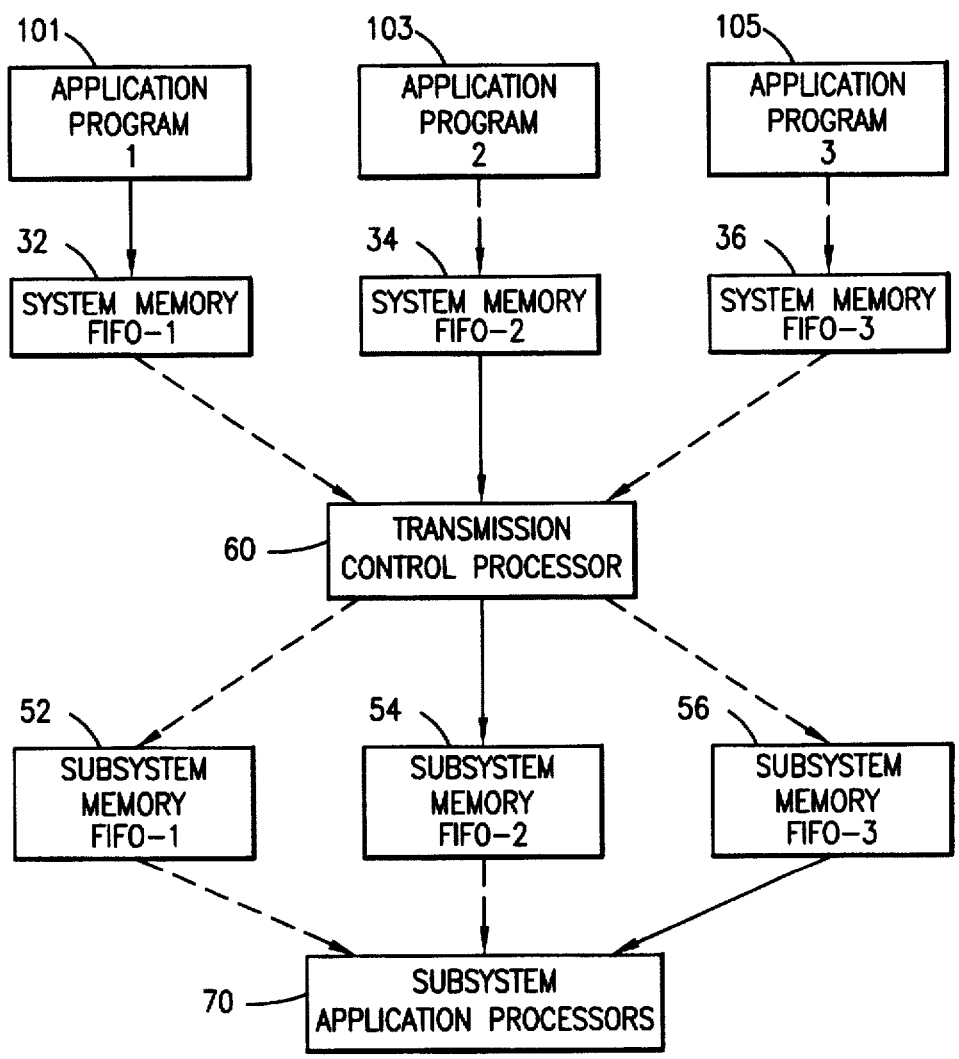
FIG. 6 is a data flow diagram of a preferred embodiment of the present invention, showing plural data paths.

Referring now to FIG. 6, the invention described herein may also be used to transfer information from multiple FIFOs in host memory 30 to multiple FIFOs in subsystem memory 50. This operation is accomplished under the control of transmission control processor 60 wherein each FIFO 32, 34, 36, 52, 54, 56 contains a pointer which points to the next FIFO 34, 36, 54, 56 in linked list 57 and wherein the last FIFO 36, 56 points back to the first FIFO 32, 52. Using this arrangement, information transfers between multiple FIFO pairs such as 32-52, 34-54, etc. can be handled by traversing linked list 57.

More than one application program such as 101, 103 and 105 may be operating concurrently in host processor 20 generating data and control information for subsystem applications. Each application program 101, 103, and 105 generates a data or control stream and stores the information in a FIFO register associated with that application program. For example, application program 101 is allocated FIFO-1 32, application program 103 has allocated to it FIFO-2 34, and application program 105 has allocated to it FIFO-3 36, all of the FIFOs being in system memory 30. Each application stores data or control information into the respective FIFO for transmission to the subsystem memory 50. Each system memory FIFO 32, 34, and 36 operate as virtual adapters which transmit data or control information to corresponding virtual adapters in the form of FIFOs 52, 54, and 56 in subsystem memory 50 all under the control of transmission control processor 60.

The DMA data transfer frees the host processor 20 to continue other processing while data and control information is being exchanged between pairs of virtual adapters such as 32-52; 34-54; and 36-56 under the control of transmission control processor 60.

Transmission control processor 60 controls the information flow between a virtual adapter such as FIFO 34 in system memory 30 and FIFO 54 in subsystem memory 50 as shown by the solid lines between FIFO 34 and transmission control processor 60 and transmission control 60 and subsystem memory FIFO 54 in FIG. 6. The dotted lines between FIFO 32 and transmission control processor 60 and FIFO 36 and transmission control processor 60 indicate additional available paths which can be employed to transmit data and control information after the end of the information contained in FIFO 34 has been reached. Similarly, there are dotted lines between transmission control processor 60 and FIFO 52 and between transmission control processor 60 and FIFO 56 also indicating available data paths after the transmission between FIFO 34 and FIFO 54 has been completed.

Further, as an example, FIFO 52 may be active in providing data and control information to subsystem application processors 70 for use in generating graphics representations to be displayed on display device 86 (see FIG. 4).

In effect, the use of FIFO pairs 32-52, 34-54, and 36-56, under the control of transmission control processor 60 allows efficient use of the system bus 40 by streaming data between system memory 30 and subsystem memory 50 in sufficient quantities to justify the overhead of using DMA transfer while at the same time freeing the host processor for other processing.

Transmission control processor may also scan information transmitted between host memory 30 and subsystem memory 50 on system bus 40 to search for program operation codes. When predetermined operation codes are encountered in the transfer, transmission control processor 60 may halt the process and post an interrupt to host processor 20 and systems application processor 70.

Although the present invention and its advantages have been described in detail, it should be understood that various changes, substitutions and alterations can be made herein without departing from the spirit and scope of the invention as defined by the appended claims.

What is claimed is:

1. A method for efficient transmission of data in an information handling system between a first memory means and a second memory means comprising the steps of:

comparing a read pointer and a write pointer associated with a temporary register in said first memory means to determine if there is sufficient data in said temporary register for efficient transmission between said temporary register and a temporary register in said second memory means;

performing a direct memory access transfer if said compare step indicates sufficient data for efficient transfer;

updating said read address pointer and said write address pointer to reflect the data transfer;

determining if there is another temporary register containing data to be transferred; and repeating said above steps for a next temporary register.

2. A method according to claim 1 further comprising the step of determining whether there is sufficient space in said one or more temporary registers in said second memory means to accommodate the quantity of data to be transmitted.

3. A method according to claim 1 further comprising the step of updating one or more counters which contain counts representing a number of attempts to transmit information.

4. A method according to claim 1 further comprising the step of determining if there is more than one temporary storage register in said first memory means containing information to be transmitted to said second memory means; and moving to a next temporary storage register after completion of data transfer from a previous temporary storage register if it has been determined that there is more than one temporary storage register containing data to be transmitted.

5. An information handling system, comprising:

a first processing means for executing application programs under control of an operating system program;

a first memory means connected to said first processing means for storing information in the form of programs and data associated with said first processing means, said first memory means comprising one or more temporary storage registers for accumulating said information for transmission between said first memory means and one or more peripheral subsystems;

a transmission means connected to said first memory means for transmitting said information between said first memory means and said one or more peripheral subsystems;

one or more peripheral subsystems connected to said transmission means, each said peripheral subsystem comprising:

a transmission control means connected to said transmission means for controlling transmission of information between said first memory and said peripheral subsystem, said transmission control means further comprising means for comparing a read address pointer and a write address pointer associated with one or more temporary storage registers for determining if a quantity of data in said one or more temporary registers has reached a first minimum level, such that transmission of data is enabled between said first memory means and said one or more peripheral subsystems;

a second memory means, connected to said transmission means and said transmission control means for storing information received from said first memory means and information to be transmitted to said first memory means, said second memory means comprising one or more temporary registers for storing said information received from said first memory means and for accumulating data to be transmitted from said second memory means to said first memory means; and a second processor connected to said second memory means for processing information transmitted between said first memory means and said second memory means.

6. An information handling system according to claim 5 further comprising:

a video display system connected to said second processor for displaying results of processing information by said second processor.

7. An information handling system according to claim 6 wherein said video display system displays graphic representations of the information resulting from processing by said second processor.

8. An information handling system according to claim 5 wherein said temporary storage registers in said first memory comprise first in first out registers.

9. An information handling system according to claim 5 wherein said one or more temporary registers in said second memory means comprise first in first out registers.

10. An information handling system according to claim 5, further comprising:

means for determining whether there is sufficient space in said one or more temporary registers in a receiving memory means to accommodate the quantity of data to be transmitted.

11. An information handling system according to claim 5, further comprising:

means for updating one or more counters which contain counts representing a number of attempts to transmit data.

12. An information handling system according to claim 5, further comprising:

means for determining if there is more than one temporary storage register in a transmitting memory means containing data to be transmitted to a receiving memory means; and means for moving to a next temporary register after completion of data transfer from a previous temporary register if it has been determined that there is more than one temporary register containing data to be transmitted.

* * * * *